(12) United States Patent
Gourley (10) Patent No.: US 8,131,112 B1
(45) Date of Patent: Mar. 6, 2012

(54) METHOD FOR DETECTING CANCER IN A SINGLE CELL USING MITOCHONDRIAL CORRELATION MICROSCOPY

(75) Inventor: Paul L. Gourley, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1383 days.

(21) Appl. No.: 11/487,826

(22) Filed: Jul. 17, 2006

Related U.S. Application Data

(60) Provisional application No. 60/761,593, filed on Jan. 23, 2006.

(51) Int. Cl.
*G06K 9/36* (2006.01)
*G06K 9/00* (2006.01)

(52) U.S. Cl. .......... 382/280; 702/21; 382/128; 382/133; 382/286

(58) Field of Classification Search .................. None
See application file for complete search history.

(56) References Cited

U.S. PATENT DOCUMENTS

| | | | |
|---|---|---|---|
| 6,026,174 | A | 2/2000 | Palcic et al. |
| 6,211,955 | B1 * | 4/2001 | Basiji et al. .................. 356/326 |
| 6,249,341 | B1 * | 6/2001 | Basiji et al. .................. 356/73 |
| 6,404,497 | B1 | 6/2002 | Backman et al. |
| 6,624,890 | B2 | 9/2003 | Backman et al. |
| 6,922,583 | B1 | 7/2005 | Perelman et al. |
| 6,975,899 | B2 | 12/2005 | Faupel et al. |
| 2004/0229210 | A1 * | 11/2004 | Sabry et al. ..................... 435/4 |
| 2008/0046190 | A1 * | 2/2008 | Rimm et al. ..................... 702/19 |
| 2008/0262384 | A1 * | 10/2008 | Wiederkehr et al. .......... 600/569 |

OTHER PUBLICATIONS

Gourley et al. (Proceedings of SPIE (2005) vol. 5699, pp. 461-472).*
Gourley et al. (Biomedical Microdevices Dec. 2005, vol. 7, No. 4, pp. 331-339).*
Johnson et al. (PNAS (1980) vol. 77, No. 2, pp. 990-994).*
Malik et al. (Journal of Microscopy (1996) vol. 182, Pt. 2, pp. 133-140).*
Drezek et al. Applied Optics (1999) vol. 39, No. 16, pp. 3651-3661.*
Gourley et al. Sandia Report (SAND2004-6388) Jan. 2005, Sandia National Laboratories, New Mexico.*
Landman et al. (Microscopy Research and Technique (2004) vol. 64, pp. 103-112).*
Smithpeter et al. Journal of Biomedical Optics vol. 3, No. 4, pp. 429-436.*
Judith R. Mourant et al, "Mechanisms of light scattering from biological cells relevant to noninvasive optical-tissue diagnostics" Applied Optics. vol. 37, No. 16 pp. 3586-3593, 1998.
Andrew Dunn et al, "Three-Dimensional Computation of Light Scattering from Cells", IEEE Journal of Selected Topics in Quantum Electronics, vol. 2 No. 4, 1996, pp. 898-905.
Rebekah Drezek et al, "A Pulsed Finite-Difference Time-Domain (FDTD) Method for Calculating Light Scattering from Biological Cells Over Broad Wavelength Ranges," Optics Express, 2002, vol. 6, No. 7, pp. 147-157.
Josephine S. Modica-Napolitano et al, "Mitochondria as targets for detection and treatment of cancer," http://www.-ermm.cbcu.cam.ac.uk, pp. 1-19, 2002.
N. M. Lawandy, et al, "Laser action in strongly scattering media," Nature, vol. 368, 1994, pp. 436-438.

* cited by examiner

*Primary Examiner* — Lori A Clow
(74) *Attorney, Agent, or Firm* — Carol I Ashby (57) ABSTRACT

A method for distinguishing a normal cell from an abnormal cell, such as, for example a cancer cell or diseased cell, of the same tissue type using mitochondrial correlation microscopy.

6 Claims, 9 Drawing Sheets

Fluorescence    Wide-Angle Scattering

Normal Cell

Figure 2a

Cancer Cell

Cancer

Maximum frequency is 130040 at Intensity = 0.
Values found from Minimum = 0 to Maximum = 2000.

Figure 4a

Maximum frequency is 122761 at Intensity = 0.
Values found from Minimum = 0 to Maximum = 3840.

Cancer

METHOD FOR DETECTING CANCER IN A SINGLE CELL USING MITOCHONDRIAL CORRELATION MICROSCOPY

This application claims priority benefit from U.S. Provisional Patent Application Ser. No. 60/761,593, filed on Jan. 23, 2006, which is incorporated herein by reference.

The United States Government has rights in this invention pursuant to Department of Energy Contract No. DE-AC04-94AL85000 with Sandia Corporation.

BACKGROUND OF THE INVENTION

Currently pathologists rely on labor-intensive microscopic examination of tumor cells using staining techniques originally devised in the 1880's that depend heavily on specimen preparation and that can give false readings. An alternative method is highly desirable. A cellular component that can be potentially useful in diagnosing cellular condition is the mitochondrion. Mitochondria play important roles in cellular energy metabolism, free radical generation, and apoptosis. They have been shown to be the primary light-scattering centers for wide-angle scattering and they determine the light-penetration properties of tissues (J. R. Mourant et al., "Mechanisms of light scattering from biological cells relevant to noninvasive optical-tissue diagnostics," Appl. Optics Vol 37 (1998) pp. 3586-93). Differences in mitochondria in normal and cancer cells of the same tissue type are manifest in the scattering behavior of the mitochondria.

Mitochondria are most commonly observed in fixed tissue samples as oval particles of 1 to 2 micrometer in length and 0.5 to 1 micrometer in width. The organelle has an outer membrane that encloses the entire contents of the mitochondrion. An inner membrane forms a series of folds called cristae which project inward toward the interior of the organelle. In living cells, as observed by staining mitochondria with rhodamine 123 and performing fluorescence microscopy, mitochondria are dynamic networks of long filamentous structures capable of changing size, form, and location.

Cancer cells have an altered metabolism compared to normal (noncancerous) cells, and mitochondria are involved in many aspects of the altered metabolism of cancer cells. Defects in mitochondrial function have long been suspected to contribute to the development and progression of cancer. A key event in carcinogenesis may involve the development of an "injury" to the respiratory machinery, resulting in compensatory increases in glycolytic ATP production to replace the normal, high-efficiency oxidative phosphorylation as the preferred means of ATP formation. The differences in energy metabolism between normal and cancer cells constitute a biochemical and biophysical basis to speculate that strategies might be developed to selectively identify and kill cancer cells due to their inherently compromised respiratory state. A number of cancer-related mitochondrial defects have been identified and described in the literature.

Mitochondrial hyperplasia can be encountered in tumors from different organs, so-called oncocytomas, and it has been suggested to be related to defective mitochondrial function. Malignant tumor cells with high proliferation index contain fewer mitochondria and, in spite of their higher metabolic activity, they obtain most of their ATP from anaerobic glycolysis, possibly reflecting an adaptive phenomenon to low oxygen concentrations. Conversely, increased numbers of mitochondria resulting in an oncocytic phenotype are usually encountered in benign or low-grade malignant tumors. Oncocytic tumors have been reported in many sites, mainly in kidney, salivary gland, hypophysis, thyroid and parathyroid glands, lung, adrenal gland, and liver. In most of these tumors, mitochondrial hyperplasia is the result of a compensatory mechanism related to abnormalities in mitochondrial function rather than an increase in energy production by tumor cells.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a method for distinguishing a normal cell from an abnormal cell, such as, for example a cancer cell or diseased cell, of the same tissue type using mitochondrial correlation microscopy. As described below by means of illustrative embodiments, the method uses the characteristics light that has interacted with the mitochondria of the cell to determine whether the cell is normal or abnormal, such as a cancerous or diseased cell where the disease manifests itself in changes of the mitochondria and the mitochondrial network. Two types of interacted light described in embodiments of this invention are the scattered light and fluorescence emission from the mitochondria in a single cell. Interacted light is the light after the incident light from a light source has interacted with a cell. The embodiments of this invention described in detail herein employ fluorescent microscopy and wide angle light scatter microscopy (also known as ultra-dark field imaging). In various embodiments, the fluorescent and scattered images can be used independently or in combination. In combination embodiments, the images are superposed and/or co-localization diagrams can be used to reveal correlations between the image intensities at each pixel. This is helpful in some embodiments for differentiating normal and cancer (diseased) cells. There are many other imaging modalities that could be used to perform similar analyses in additional embodiments of this invention. Other combinations of light signals can be obtained from scattered, reflected, transmitted, phase contrast, fluorescence, spontaneous or stimulated emission of light. These include phase contrast, differential interference contrast, phase refractometry, stimulated emission, stimulated emission depletion, Raman scattering, coherent anti-Stokes Raman scattering, and fluorescence correlation microscopies.

The cells used in these illustrative embodiments are normal and/or transformed (cancerous) mouse liver cells. Any cell that comprises mitochondria can, in principle be characterized using this invention. Mitochondria are found in nearly all eukaryotic cells, where they can make up as much as 10% of the cell volume. Thus, there are many other kinds of cells that can be characterized using the method of this invention. The abundance of mitochondria varies with cellular energy level and is a function of cell type, cell-cycle stage and proliferative state. Those cells that comprise large numbers (hundreds to thousands) of mitochondria will be especially amenable to the statistical analyses of collective phenomenon described in some of the embodiments herein. Typical examples include animal cells, such as those found in muscle, liver, lung, and brain tissue. Brown adipose tissue cells, hepatocytes and certain renal epithelial cells also tend to be rich in active mitochondria. Cells with more limited numbers of mitochondria are still amenable to single particle statistical analysis as the individual mitochondria are more easily measured and characterized. These include certain kinds of blood cells, quiescent immune-system progenitor or precursor cells, and yeast cells. Some types of diseased cells show a reduced number of mitochondria such as in Alzheimer's disease. Thus, embodiments of this invention may be used for detecting a variety of diseases, including but not limited to cancer, at a very early stage by examining individual cells and can reduce or eliminate delays in diagnosis and treatment. The embodiments described herein use as examples liver cells that have been chemically transformed into cancerous cells, but applications of the method of this invention is not restricted to identifying cancer cells.

The importance of mitochondria as scattering centers derives from their size being nearly the same as the wavelength of visible light. Mitochondria play important roles in cellular energy metabolism, free radical generation, and apoptosis. Differences between mitochondria in normal and cancer cells of the same tissue type are manifest in the scattering and fluorescence behaviors of the mitochondria. These differences can be used to discriminate between individual cells that are normal or cancerous. For example, one mitochondrial characteristic that is quite different in normal and cancerous cells is the nature of the mitochondrial network.

Mitochondria occur in large numbers in the liver, which serves as a storehouse of food energy (glycogen) for the body. Thus, liver cells are convenient models for studying mitochondria and changes arising from the effects of cancer. In the specific embodiments described herein, comparison is made between normal liver cells and cells of the same cell line that have been transformed into cancer cells by carcinogens. However, the characteristics of the normal and cancerous cells described herein are generally observed in normal and cancerous cells from other sources; the method described herein is applicable to a wide range of cell types; other possible cell types include, but are not restricted to muscle, liver, lung, brain, adipose, and renal cells. In some embodiments, images of both types of cells were taken by one or both of two different laser scanning confocal microscopy techniques: wide-angle scattering and fluorescent imaging. Laser-scanning confocal microscopes are one type of imaging microscope. Other types of imaging microscopes that are capable of generating images of a cell with adequate resolution to distinguish the location of the mitochondria within the cell can also be used in embodiments of this invention.

The fluorescent imaging used in the embodiments described in detail herein uses fluorescent molecular probes to label the mitochondria and reveal their size, shape, and distribution within the cell. One or more of many fluorescent chemicals or dyes that selectively bind to mitochondria can be used in embodiments of this invention. A variety of dyes that selectively bind to mitochondria are available from commercial sources. Some will be discussed later in terms of specific embodiments of this invention; other mitochondria-binging dyes than those mentioned below can also be used.

The embodiments using a wide-angle scattering technique image the cells using an ultra-dark field technique. In these embodiments, only light scattered at large (wide) angles contribute to the measured image. The scattering angles contributing to ultra-dark-field imaging in wide-angle-scattered images are determined by the optics of the objective lenses of the microscope. In the embodiments described herein, a high-power oil-immersion objective lens was employed that yielded images from light scattered at large angles greater than about 40 degrees from normal. Large-angle or wide-angle scattering typically refers to angles larger than approximately 10-20 degrees from normal. Other optical microscopes with different optics may yield wild-angle-scattering images at somewhat different angles. Because mitochondria are of the size that is very effective for strong light scattering at wide (large) angles, they dominate the ultra-dark-field image. More than 90% of the wide-angle light scattering comes from those areas of the cell where the mitochondria are present.

Wide-angle light scattering is a very effective method for imaging mitochondria. The method of finite-difference time-domain light propagation (R Drezek, A. Dunn, and R. Richards-Kortum, "A pulsed finite-difference time-domain (FDTD) method for calculating light scattering from biological cells over broad wavelength ranges," Optics Express 6 (2000) pp. 147-157.) is well suited for defining the limit between Mie and Rayleigh scattering for mitochondria modeled as biospheres, by calculating the far-field light scattering distribution from biological particles suspended in water. When values of the refractive index of 1.43 for the biosphere and 1.333 for the aqueous solution are used, particles of the typical size range of mitochondria are calculated to dominantly produce Mie rather than Rayleigh scattering. The transition from Mie to Rayleigh scattering for biospheres in water is calculated to be in the range 200 to 300 nm.

There are important consequences of this transition: One consequence of the transition relates to ultra-dark-field imaging microscopy. That imaging records scattered light restricted to very large angles (about 72 degrees from normal, as determined by the optics of the high-power oil-immersion objective lenses used in the demonstrated embodiments of this invention. The optics of the microscope system will determine the suitable angles.). The calculation predicts that such imaging will have appreciable intensity only for particles that are less than about 600 nm in size, corresponding closely to the size of mitochondrial in cells. Thus ultra-dark-field imaging is a very good method for imaging mitochondria.

There are differences between a mitochondrial network and a random distribution of independent mitochondria. Mitochondrial spheres would be independent, not correlated in space, and randomly distributed. This would produce a far-field pattern that is representative of averaged single spherical mitochondrial scatter. That pattern would be symmetrical with angular spread related to average diameter and would not be imposing or interfering with modes set up by other internal cell structures: less scatter, less loss, more simple mode structure, fewer modes.

In contrast, a mitochondrial network with interconnections that are spatially correlated leads to a far-field scattering pattern that exhibits more structure, depending upon the periodicity or self-symmetry of the network. The small-angle features would be related to large-scale correlations, and the large-angle features would be related to the thickness and optical density of tubules in a network.

The mitochondrial network structure is not precisely periodic but has a regularity determined by the bioenergetics. That is, thermodynamics will determine some average size of a mitochondrial thread diameter, and the respiration process will set some ratio of (surface area)-to-(bulk volume), according to the energy demand of the cell. This in turn will impose a filling factor of mitochondria/cytosol in the matrix. Thus, there will be an arrangement that can roughly be described by an average size, average spacing, and a filling factor.

A dense collection of mitochondria in cells is appropriately understood in term of light scattering by correlated single-scatterers in the Rayleigh-Gans regime. Recently Cox et al. (S. J. Cox, V. Y. Reshetnyakzx, and T. J. Sluckinz, "Effective medium theory of light scattering in polymer dispersed liquid crystal films," J. Phys. D: Appl. Phys. 31 (1998) pp. 1611-1625) have reviewed this work in connection with light scattering from polymer networks. A dense array of scatterers also means that the scatterers no longer scatter independently. The spatial distribution of the scattering objects influences the extinction of light in two ways: multiple scattering and interference. Multiple scattering is important when the path of light in the dispersion is so long that the contribution of the scattered light into the direction of the incident beam is significant. The presence of neighbors affects the way in which an individual scatterer carries out this task, over and above purely phase effects. This phenomenon is sometimes known as dependent scattering. Interference affects primarily the distribution of the scattered light but also to a lesser degree the total scattering cross section. Interference affects the effective cross section because the cumulative effect of correlated scatterers affects the coherent phase of a scattered wave far away from the scatterers. The effect is to modify the effective differential scattering cross section via a structure factor.

The structure factor plays an important role and is intimately related to cell bioenergetics or thermodynamic quantities. If the scatterers are not identical in their scattering properties, but are identical in their correlation properties, then it is necessary to take account of so-called incoherent scattering. In general, the differential scattering cross section is $$\partial\sigma/\partial\Omega = S(q)I_c I_i \quad (1)$$

The first term in this formula involves the structure factor, $S(q)$, and the mean scattering amplitude; this is the coherent scattering $I_c$ term. The second term comes from the mean square of fluctuations from this mean amplitude. These fluctuations are not correlated at different sites and thus the contributions from each site may simply be added. This contribution is usually known as the incoherent scattering $I_i$, because correlations play no role. The structure factor is given by $$S(q) = 1 + <\rho> \int dr \exp(iq \cdot r)[g(r)-1] \quad (2)$$

where q is the change in momentum of the incident and scattered photon, $<\rho>$ is the average particle density, and $g(r)$ is the correlation function, describing the fluctuation of the particle density from the mean value. More exactly, the correlation function is related to the correlation integral of the particle density $$<\rho(r')\rho(r'+r)> = <\rho>\delta(r) + <\rho>^2 g(r) \quad (3)$$

where $\delta(r)$ is the Kronecker delta function. The correlation function mirrors the symmetry of the particle distribution, i.e. it is periodic, self-similar, or random. For a random distribution, $g=1$, so $S=1$, which is the incoherent scattering condition where phase is random and scattering intensity is simply the incoherent sum of intensities of all individual scatterers. For a periodic distribution of particles, g is periodic, and S is peaked at periodic values of the transfer momentum q. For a self-similar distribution, S is likewise self-similar, comprising features on successive scales of q. For a mesh of interconnected mitochondria, one expects to see scattering features at large angles that reflect the size and shape of the individual mitochondria, and superposed features at smaller angles that reflect the morphology of the mesh or network. Thus, the scattering spectra of mitochondria in normal and abnormal cells, such as, for example, cancer cells, ban be quite different and can be used as a basis of distinguishing between the normal and abnormal cells.

Figure 2A:
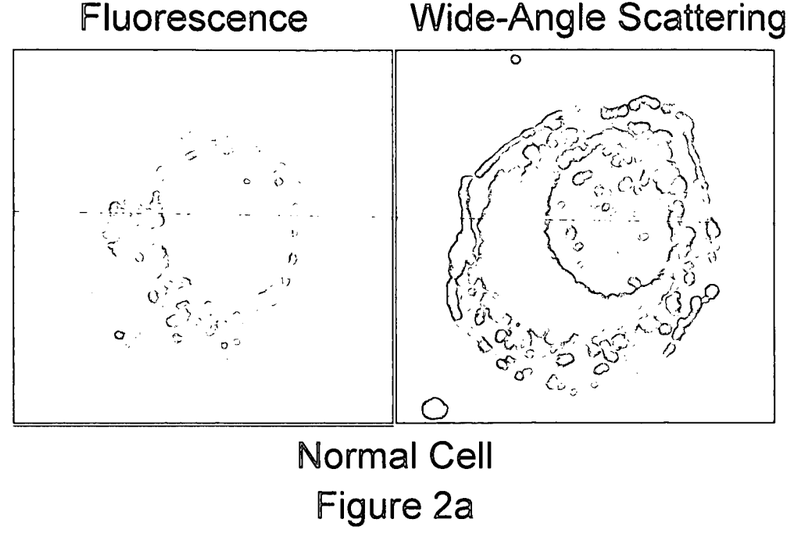
FIG. 2 illustrates images of normal and cancerous cells using wide-angle scattering or fluorescence of a dye that selectively binds to mitochondria.
Figure 2B:
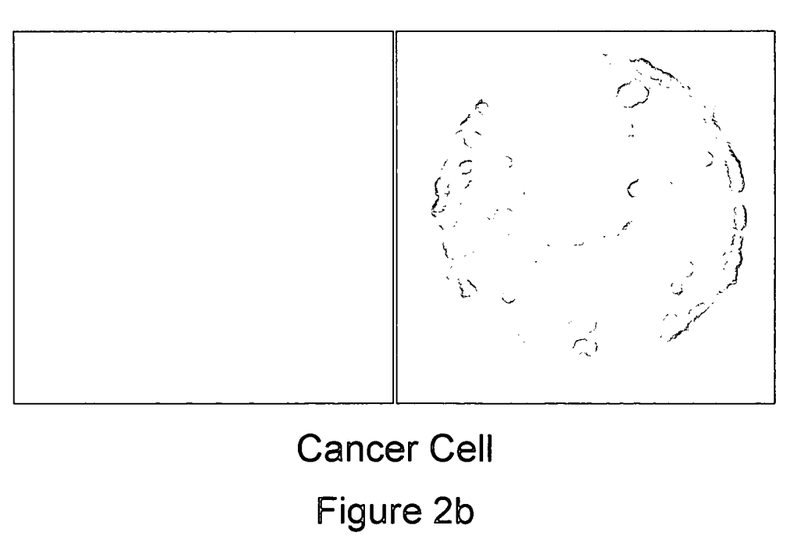

In an illustrative embodiment, normal mouse liver cells (ATCC TIB-73) and their nitrosoguanidine-transformed hepatocellular carcinoma derivative cells (ATCC TIB-76) were examined under a Zeiss laser-scanning confocal microscope (images in FIGS. 2a and 2b). The cells were probed with mitochondrial selective dyes that have long-wavelength fluorescence emission, Mitotracker Red 633 dye (M-22426) from Molecular Probes (Eugene, Oreg.). Mitotracker Red 633 dye offers advantages of a good separation of the excitation wavelength (633 nm) and emission wavelength (655 nm). However, other dyes that selectively tag mitochondria can also be used. There are a large number of molecular probes dyes that can be used to create fluorescent images of mitochondria, as described, for example, in the Invitrogen catalog (Formerly Molecular Probes). These include but are not limited to MitoTracker dyes Deep Red 633, Green, Orange, and Red 580, or MitoFluor dyes like Green, Red 589 and 594 and Far Red 680, and MitoProbe dyes. These can be used to locate the spatial position of the mitochondria and/or indicate the metabolic activity of the mitochondria. Selective dyes from other sources may also be used. The concentration of the Mitotracker dye was in the range 100-500 nM, which is the suggested concentration for staining live cells. The cells were incubated with the dye for 15 minutes, pelleted, and rinsed twice in PBS (phosphate buffer solution).

Figure 1A:
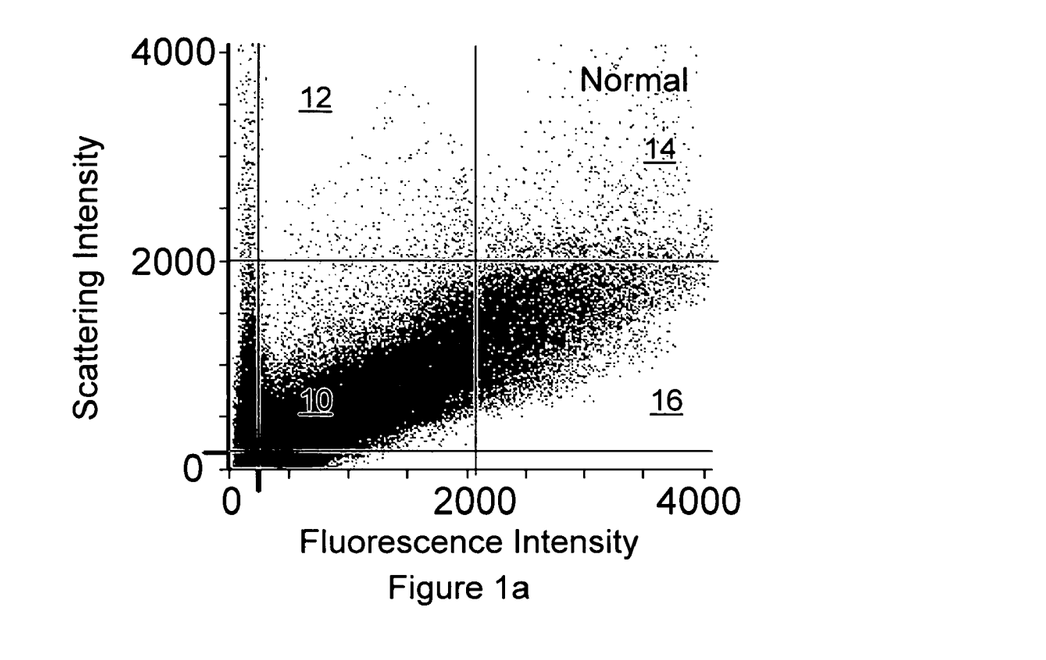
FIG. 1 illustrates co-localization histograms for fluorescence intensity and wide-angle scattering intensity from normal and cancerous mouse liver cells.

In normal cells, the mitochondria are very highly organized into a network in close proximity to the nucleus (FIG. 2a). The fluorescence outlines the nucleus, which is well defined and ovoid. The regions away from the nucleus near the outer cell membrane are almost devoid of mitochondria. The fluorescence of the normal cell is very bright and the texture is grainy, with large spatial fluctuations in intensity. In the ultra-dark-field (wide-angle-scattered) images, the light scattering occurs predominantly from the mitochondrial network and exhibits strong correlation with the mitochondrial fluorescence images. This correlation is quantified in the cell co-localization histogram (FIG. 1a). The co-localization histogram is a plot of the fluorescent intensity measured at a pixel location in the fluorescent image versus the scattered-light intensity measured at the corresponding pixel location in the wide-angle-scattered image (the image generated by wide-angle-scattered light). Other combinations of light signals for analysis using a co-localization histogram can be obtained from scattered, reflected, transmitted, phase contrast, fluorescence, spontaneous or stimulated emission of light. There are also many other imaging modalities that could be used to perform similar analyses. Other combinations of light signals can be obtained from scattered, reflected, transmitted, phase contrast, fluorescence, spontaneous or stimulated emission of light. The include phase contrast, differential interference contrast, phase refractometry, stimulated emission, stimulated emission depletion, Raman scattering, coherent anti-Stokes Raman scattering, and fluorescence correlation microscopies.

A normal cell exhibits a very large range of variation of mitochondrial signals from both fluorescence and wide-angle scattering. This large range might be related to a number of factors, such as high biological functionality, high spatial correlation, stimulated fluorescence, and photon localization. In regions where the mitochondria are more dilute, both fluorescent and wide-angle-scattered signals exhibit less variation, supporting the idea that high intensity (superlinearity) in the high density regions arises from collective phenomena. Enhancement of light intensity by collective effects in suspensions of inorganic particles has been previously discussed (N. M. Lawandy, R. M. Balachandran, A. S. L. Gomes, and E. Sauvin, "Laser action in strongly scattering media," Nature vol 368 (1994) pp. 436-8). A small percentage (less than 1%) of scattering occurs from other internal organelles. Significant scatter (about 10%) occurs from the cell membrane and that is uncorrelated with mitochondrial fluorescence. The leftmost points (running parallel with the y-axis and below 250 on the fluorescence scale) in the co-localization plots correspond to the light scattered by the membrane. The shape of the cell, as shown by the outer-membrane scattering is often irregular, not round. Additionally there is a small fraction (less than 0.5%) of light scattering from the nuclear membrane that is also uncorrelated with the mitochondrial fluorescence. In the normal-cell histogram, there is a strong correlation between light scattering and mitochondrial fluorescence intensity that extends beyond 4000 units of fluorescence intensity in this example. The fluorescence and wide-angle-scattering images of the normal cell used to generate this exemplary co-localization histogram are shown in FIG. 2a.

Figure 1B:
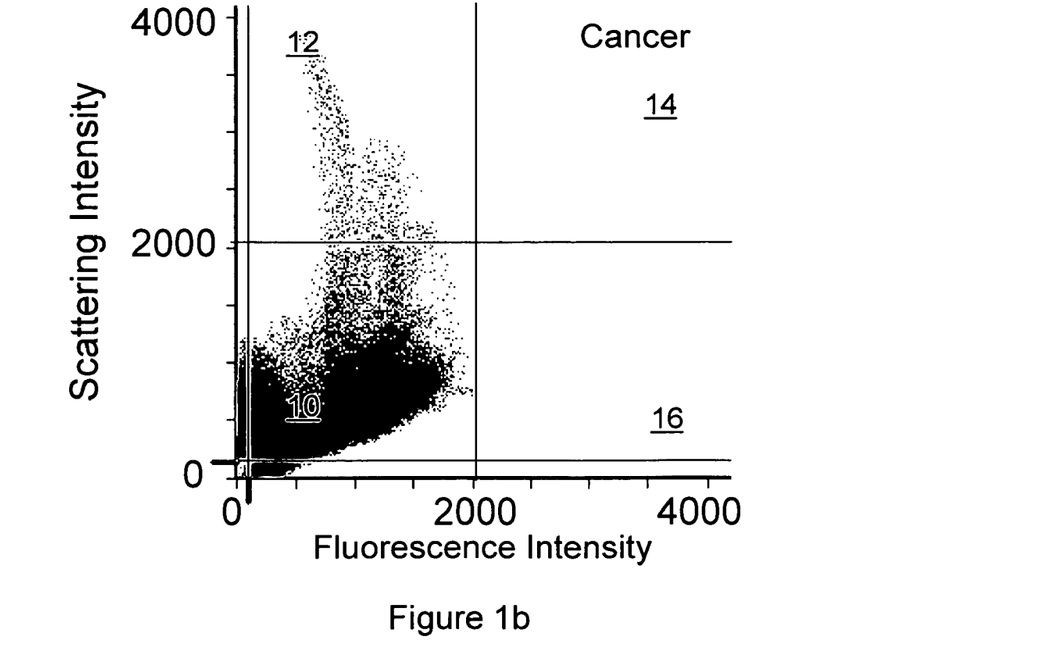

In contrast to the normal cells, the mitochondria in the transformed (cancer) liver cells have a chaotic, unorganized, random distribution throughout the cytosol of the cancer cells (FIG. 2b). The fluorescence is fairly uniformly distributed throughout the cytosol and is relatively dull in appearance, being much less intense than that in normal cells. The outline of the nucleus, defined by the fluorescence, is more irregular in shape and frequently less ovoid than in a normal cell. The light scattering is also more uniform and is highly correlated with the fluorescence. In contrast to the normal cells, the cancer cells have a more narrowly dispersed distribution as shown in the co-localization histogram (FIG. 1b). The less dispersed distribution may be due to low biological functionality, random distribution, lowered spatial density of the mitochondria, and lack of coherent light scattering or nonlinear collective processes. The fluorescence and wide-angle-scattering images of the cancer cell used to generate this exemplary co-localization histogram are shown in FIG. 2. A very high percentage of the total point distribution is located in the first quadrant 10 (the quadrant near the (0,0) point of the co-localization histogram). Also, there is significant scatter from the cell membrane, and very small scattering from the nuclear membrane, both of which are uncorrelated with the fluorescence. Generally, the cancer cells are very round in shape. In contrast to a normal cell, the cancer co-localization histogram of this cancer cell fails to show a correlation beyond 1800 units in fluorescence intensity (corresponding to the two right-most quadrants 14 and 16 of the co-localization histogram), and reveals many low-fluorescence mitochondria that are highly light-scattering, with a significant number of pixels having large light-scattering intensities but low fluorescence intensities, yielding significant numbers of data extending vertically in the two left-most quadrants 10 and 12. For the cancer cell of FIG. 1b, more than 90% of points are in the first quadrant 10.

Figure 3A:
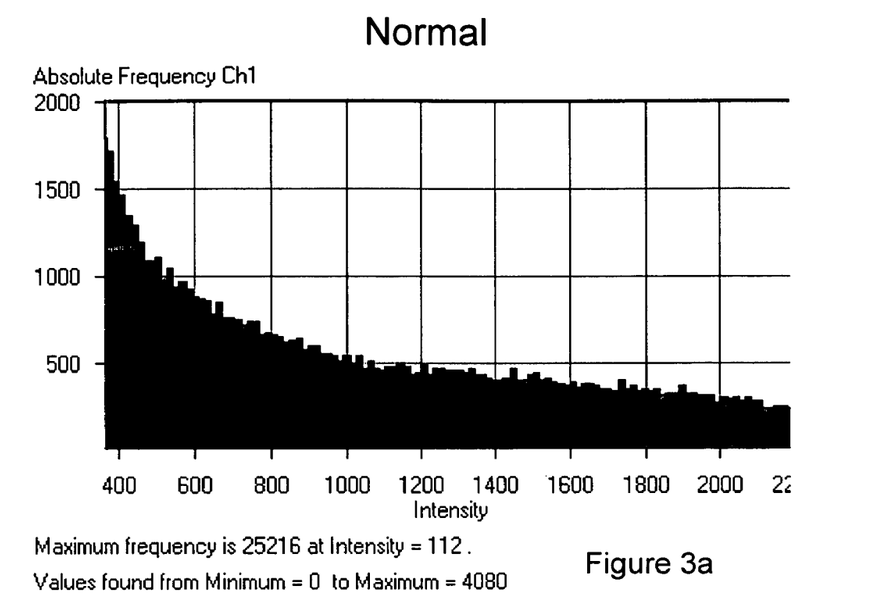
FIG. 3 illustrates the number of pixels in a pixelated image corresponding to a range of intensities for a normal cell.
Figure 3B:
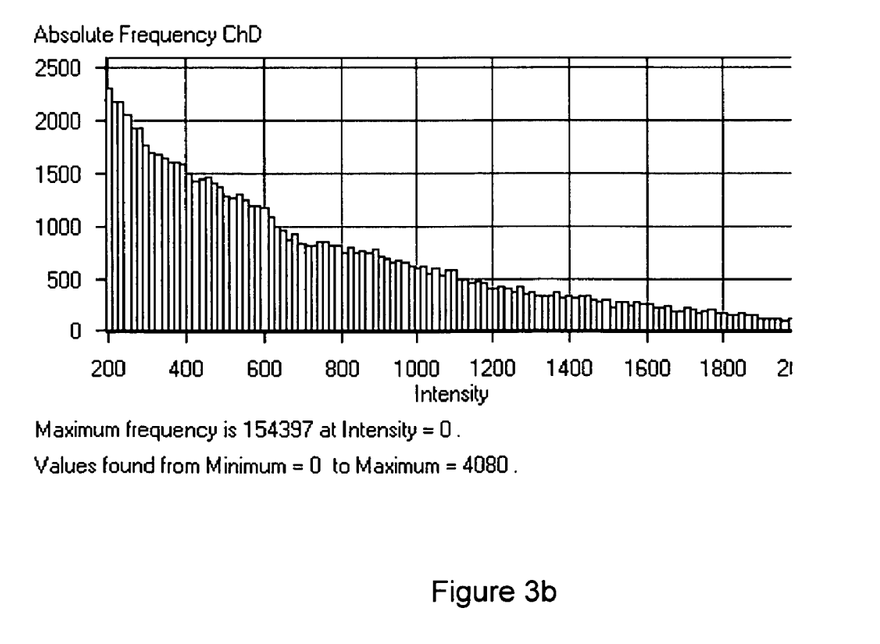
Figure 4A:
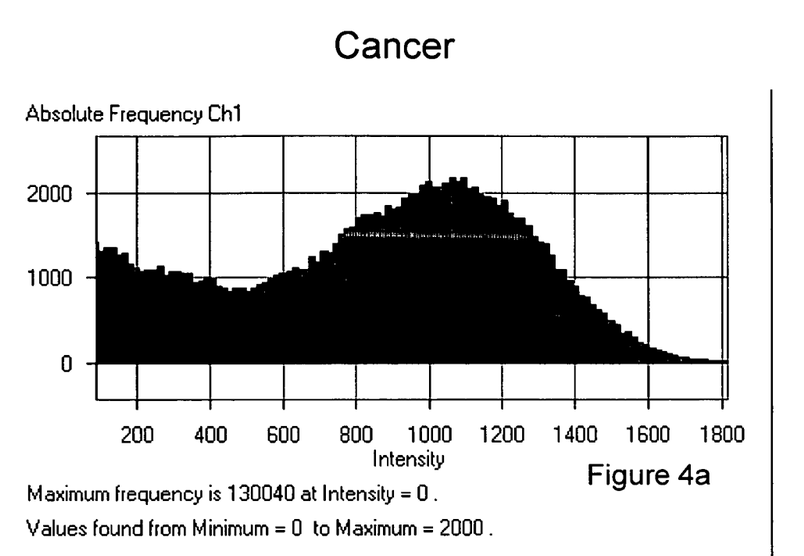
FIG. 4 illustrates the number of pixels in a pixelated image corresponding to a range of intensities for a cancer cell.
Figure 4B:
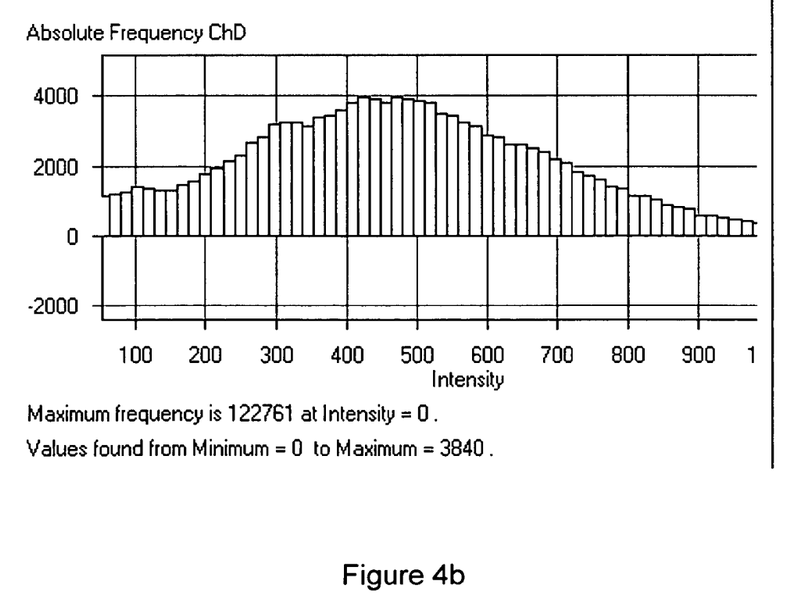

In some embodiments, the condition of a cell is determined by examining the numbers of pixels corresponding to each intensity of a range of intensities. In some of such embodiments, the fluorescence image and the wide-angle-scattering image can be analyzed individually or in combination. The numbers of pixels in a pixelated image corresponding to a range of intensities are determined and incorporated into a histogram. Examples of such histograms are shown in FIGS. 3a and 3b for a normal cell and FIGS. 4a and 4b for a cancer cell. For example, the total number or absolute frequency of pixels within an intensity range corresponding to one intensity range in the histogram is plotted against that intensity range. A lineshape envelope that approximately fits the histogram can be visualized in these figures. The lineshape envelope is a generally curved line approximately tracing the frequency vs. intensity values of a histogram. The lineshape envelope of the histogram for both the wide-angle-scattering intensity (FIG. 3a) and the fluorescence intensity (FIG. 3b) for the normal cell are seen to decrease approximately monotonically with increasing intensity. In contrast, the lineshape envelope approximately tracing the frequency vs. intensity values of the histogram for both the wide-angle scattering intensity (FIG. 4b) and fluorescence intensity for the cancer cell (FIG. 4a) are seen to display a maximum at an intermediate intensity rather than decreasing approximately monotonically. They are also fewer total pixels at the higher intensities for the fluorescence of the cancer cell compared with the normal cell. Analysis of the form of the lineshape envelope of the cell can be used to determine whether it is normal or cancerous. For example, in some embodiments the wide-angle-scattering histogram can be examined to determine whether the frequency decreases approximately monotonically with increasing intensity or whether a secondary maximum occurs at a higher intensity value. Secondary maxima are seen near approximately 1100 in FIG. 4a and approximately 475 in FIG. 4b. When the cell is cancerous, the secondary maximum in the lineshape envelope is seen at intensities away from the graph origin and the envelope in that region appears approximately Gaussian or Gaussian-like in lineshape (FIG. 4b). For a normal cell, this secondary maximum is absent and the lineshape envelope decreases in an approximately exponential manner as intensity increases (FIG. 3b). Similar behavior is obtained with the fluorescence histograms, with an approximately monotonic decrease seen for the normal cell (FIG. 3a) and a maximum at higher intensities seen for the cancer cell.

The Fourier Transform is an image processing tool which is used to decompose an image into its sine and cosine components. When the input image is a spatial-domain image, the output of the transformation represents the image in the frequency domain. In the frequency (Fourier) domain image, each point represents a particular frequency contained in the spatial domain image.

Figure 5:
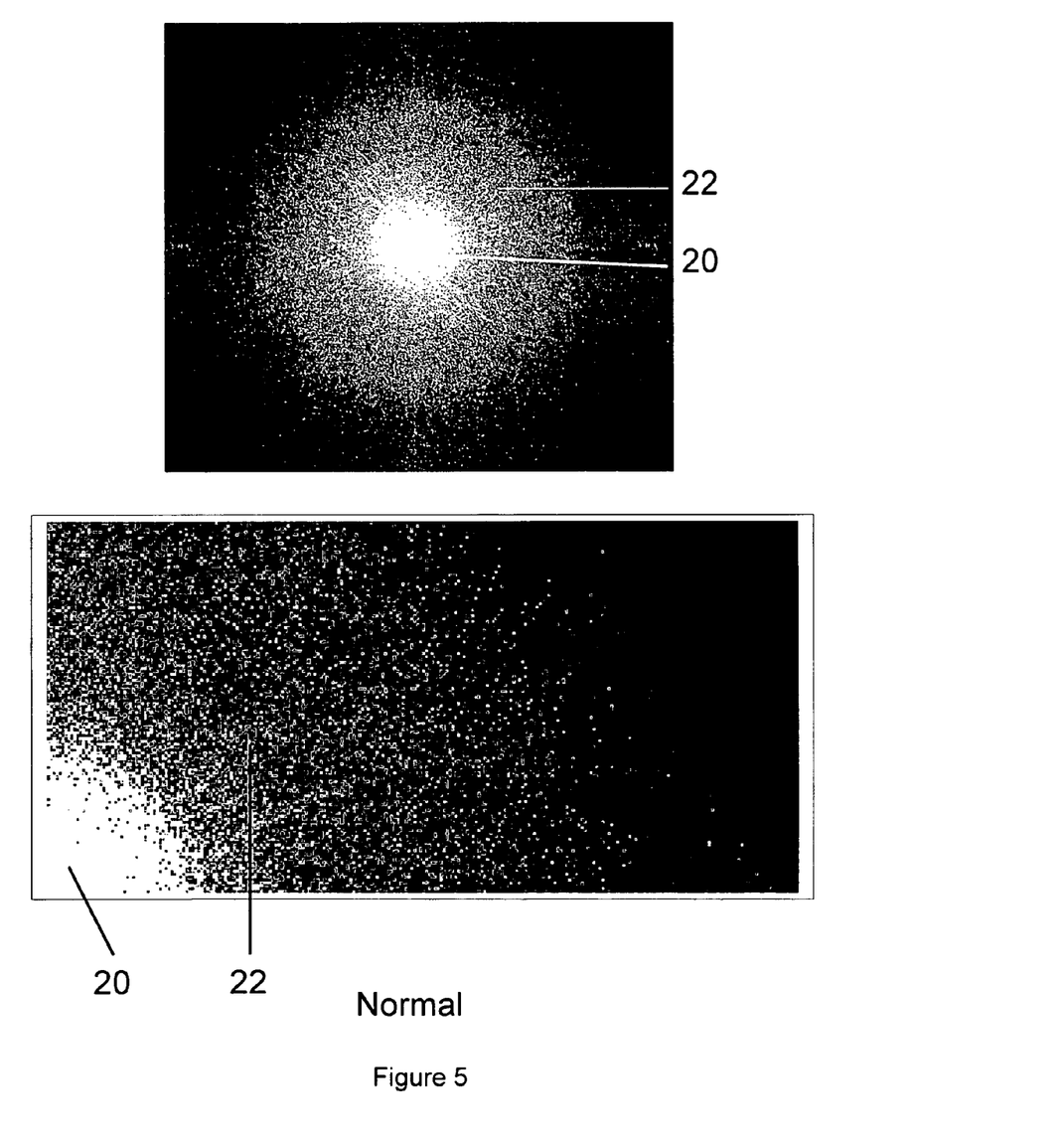
FIG. 5 illustrates the composite Fourier transform image of a normal cell. An enlarged view of a portion of one quadrant of the image is shown.
Figure 6:
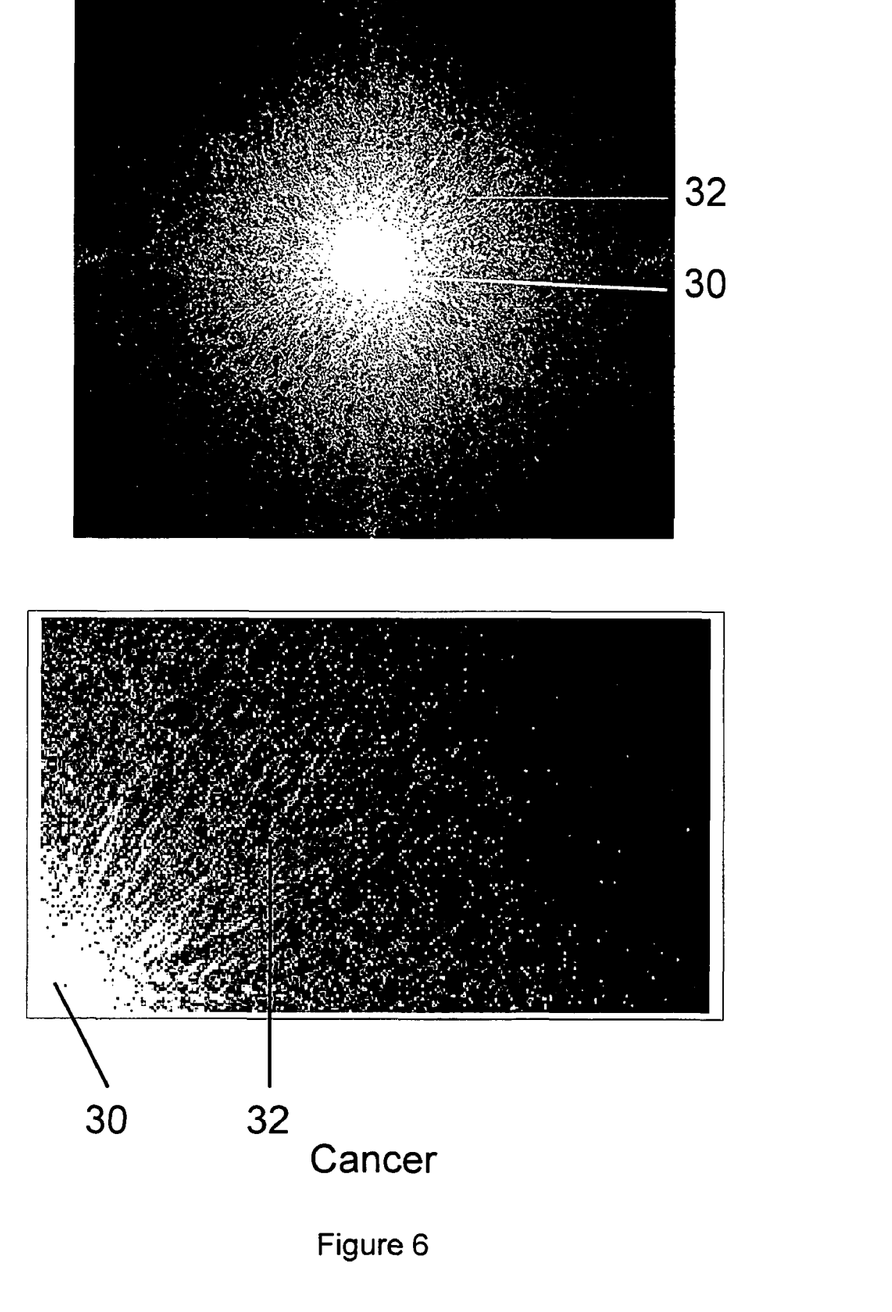
FIG. 6 illustrates the composite Fourier transform image of a cancer cell. An enlarged view of a portion of one quadrant of the image is shown.

In some embodiments, a Fast Fourier Transform (FFT) analysis is used to determine whether a cell is normal or cancerous. The Fourier transform image can be constructed with the fluorescence image or the scattering image or the composite image comprising both the fluorescence and scattering images. It reveals the spatial frequencies present in the image. In one embodiment, composite FFT images were acquired from a normal cell (FIG. 5) and a cancer cell (FIG. 6). The normal cell has correlated mitochondria and gives an image that displays a smooth and distinct decrease with angle. There is an abrupt transition between the dense central zone 20 of the image and the diffuse halo region 22 around the central zone. In contrast, the cancer cell exhibits more gradual diminution in density between the central zone 30 and the halo region 32 in the Fourier transform image, indicating a distinctly different spatial correlation. The abruptness of the transition from the dense central zone to the more diffuse halo region in the FFT image of the normal cell are diagnostics for distinguishing between normal and cancerous cells.

For the digital images of this illustrative embodiment, a discrete Fourier transform (DFT) is used. Other Fourier transforms can also be used. The DFT is the sampled Fourier Transform and therefore does not contain all frequencies forming an image, but only a set of samples which is large enough to fully describe the spatial domain image. When the number of frequencies corresponds to the number of pixels in the spatial domain image, the image in the spatial and Fourier domain are of the same size.

For a square image of size N×N, the two-dimensional DFT is given by:

$$F(k,l) = \frac{1}{N^2} \sum_{i=0}^{N-1} \sum_{j=0}^{N-1} f(i,j) e^{-i2\pi\left(\frac{ki}{N} + \frac{lj}{N}\right)}$$

where f(i,j) is the image in the spatial domain and the exponential term is the basis function corresponding to each point F(k,l) in the Fourier space. The value of each point F(k,l) is obtained by multiplying the spatial image with the corresponding base function and summing the result.

The basis functions are sine and cosine waves with increasing frequencies, that is, F(0,0) represents the DC-component of the image which corresponds to the average brightness and F(N−1,N−1) represents the highest frequency.

In a similar way, the Fourier image can be re-transformed to the spatial domain. The inverse Fourier transform is given by:

$$F(i,j) = \frac{1}{N^2} \sum_{k=0}^{N-1} \sum_{l=0}^{N-1} F(k,l) e^{-i2\pi\left(\frac{ki}{N} + \frac{lj}{N}\right)}$$

To obtain the result for the above equations, a double sum has to be calculated for each image point. However, because the Fourier Transform is separable, it can be written as $$F(k,l) = \frac{1}{N} \sum_{j=0}^{N-1} P(k,j) e^{-i2\pi \frac{lj}{N}}$$

Where $$P(k,j) = \frac{1}{N} \sum_{i=0}^{N-1} f(i,j) e^{-i2\pi \frac{ki}{N}}$$

Using these two formulas, the spatial domain image is first transformed into an intermediate image using N one-dimensional Fourier Transforms. This intermediate image is then transformed into the final image, again using N one-dimensional Fourier Transforms. Expressing the two-dimensional Fourier Transform in terms of a series of 2N one-dimensional transforms decreases the number of required computations. Even with these computational savings, the ordinary one-dimensional DFT has $N^2$ complexity. This can be reduced to $N \log_2 N$ if we employ the Fast Fourier Transform (FFT) to compute the one-dimensional DFTs. This is a significant decrease in computation time, in particular for large images. There are various forms of the FFT and most of them restrict the size of the input image that may be transformed, often to $N=2^n$ where n is an integer. The mathematical details are well described in the literature and known to those skilled in the art.

Figure 7:
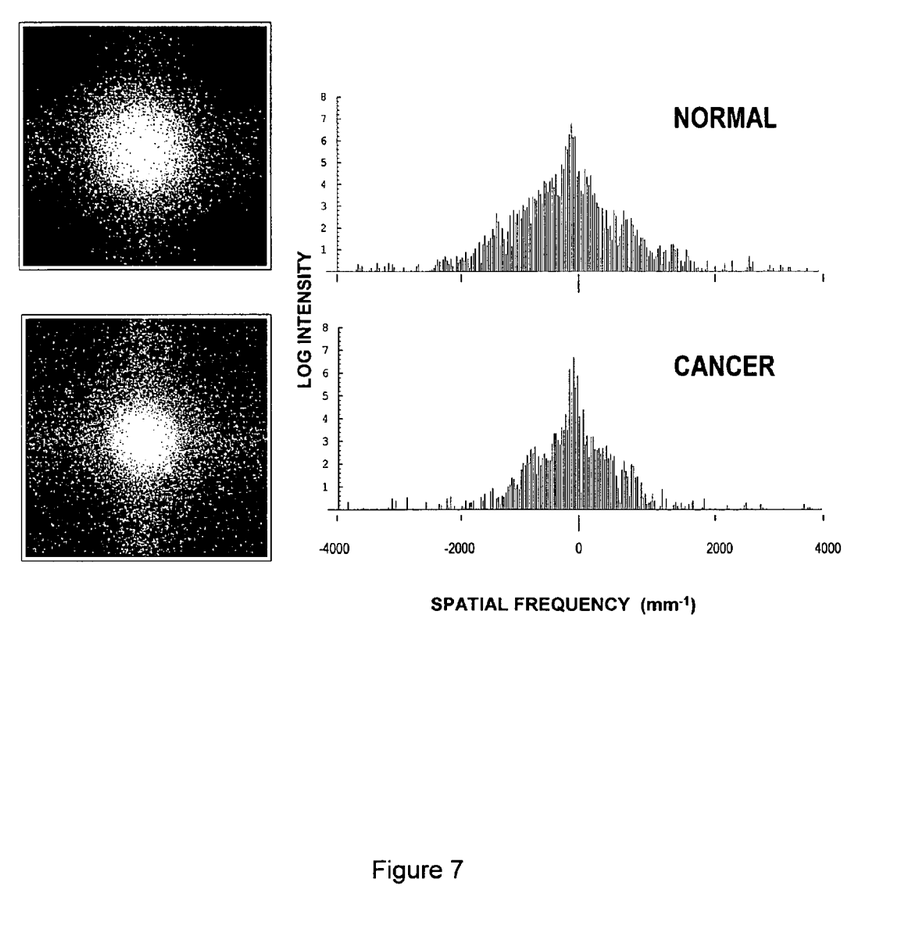
FIG. 7 illustrates the fluorescent Fourier transform images of a normal cell and a cancer cell and the corresponding line profiles.

The Fourier Transform produces a complex number valued output image which can be displayed with two images, either with the real and imaginary part or with magnitude and phase. In image processing, often only the magnitude of the Fourier Transform is displayed, as it contains most of the information of the geometric structure of the spatial domain image. However, if one want to re-transform the Fourier image into the correct spatial domain after some processing in the frequency domain, one must preserve both magnitude and phase of the Fourier image. The Fourier domain image has a much greater range than the image in the spatial domain. Hence, to be sufficiently accurate, its values are usually calculated and stored in float values FIG. 7 illustrates line profiles through the fluorescence Fourier transform images of a normal and a cancerous cell. The normal cell network has a wider range of spatial frequencies and less steep fall-off in intensity moving away from the zero spatial frequency than the cancer cell network.

The autocorrelation (AC) of a discrete 2-dimensional function f(x,y) is given by the standard relation $$AC = \langle f(x,y), f(x,y) \rangle = \Sigma_m \Sigma_n f(m,n) f(x+m, y+n)$$

where the indices m and n run from 0 to M−1 and N−1 respectively, and the indices x and y run from 0 to M−1 and N−1 respectively. A convenient way to obtain the autocorrelation function is to Fourier transform the function f and square its amplitude and inverse Fourier transform the result. The autocorrelation function is a measure of how similar the function is to itself across space. In the present case we use the image intensity as the function of the x and y image dimensions.

The dynamic range of the AC magnitude is a measure of the variance of mitochondrial behavior in the cell. The normal cell has much more variance than the cancer cell, consistent with a greater range of diversity in mitochondrial morphology and function.

Figure 8:
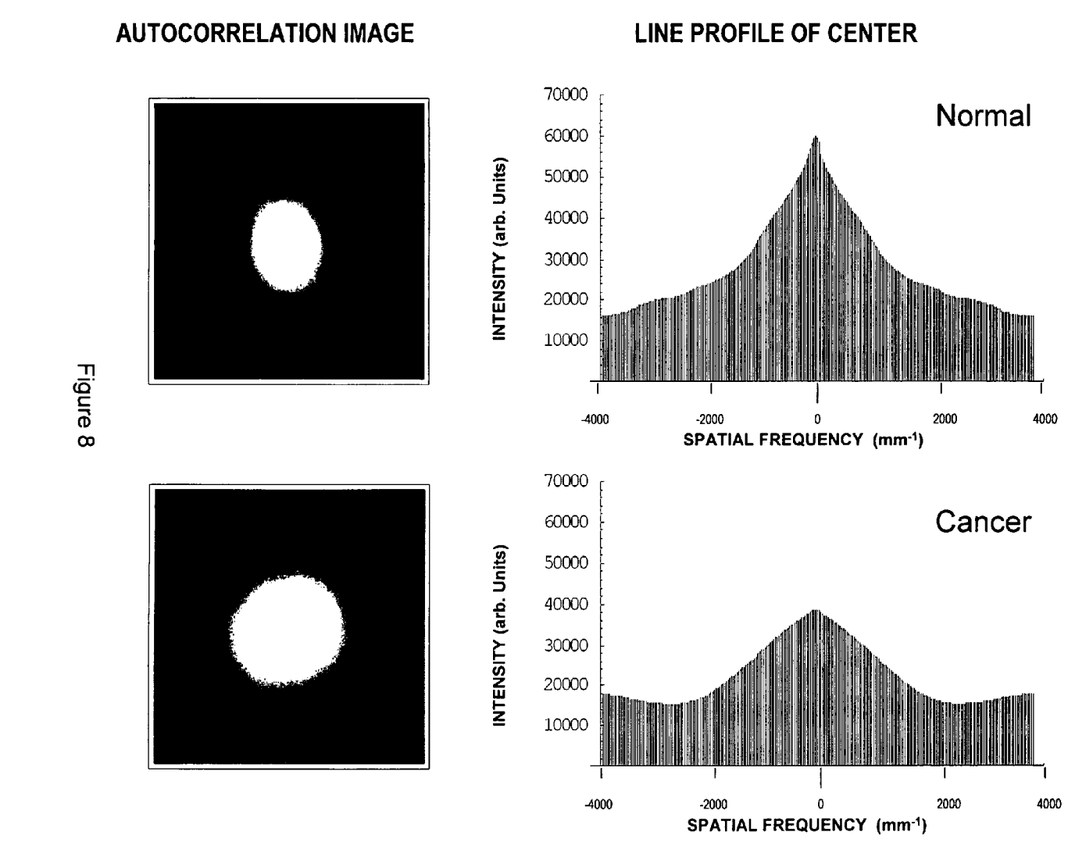
FIG. 8 illustrates the autocorrelation images of a mitochondrial network of a normal cell and a cancer cell. The line profiles display a sharp peak near the origin and show that the normal-cell mitochondrial network displays stronger correlation in the central region than the corresponding line profile for the cancer-cell mitochondrial network.

The autocorrelation image (AC) image for the normal and cancer cells are shown in FIG. 8; also shown are line profiles of each AC image in FIG. 8. The AC image for the normal cell reveals a bright spot at the center that falls off quickly to lower intensity away from the center of the image. The AC image for the cancer cell is less intense and falls off less abruptly from the center. This behavior is more clearly illustrated in the line profiles of FIG. 8. The normal-cell AC line profile exhibits a very pronounced and sharp peak near the center with maximum intensity near 50,000 units. Away from the center, the line profile falls quickly to a value near 17,000. Thus the range in the magnitude of the AC intensity is about a factor of 3. In contrast, the cancer cell AC line profile exhibits a smaller peak near 38,000 units that falls off more slowly away from the center to a value of near 19,000 units near the image edges. This profile also exhibits a pronounced local minimum, in contrast to the monotonic decrease observed with the normal cell. The range in magnitude of the AC line profile is near 2, i.e., 50% smaller than that for the normal cell.

In some embodiments, the autocorrelation image or segments thereof can be used to determine whether a cell is normal or cancerous. One such embodiment is illustrated by the difference in the line profile of the center for the normal and cancerous cells, as in FIG. 8. The intensity in the illustrated embodiment is higher in intensity and more sharply peaked around the zero of the spatial frequency. The autocorrelation of a discrete 2-dimensional function f(x,y) is given by the standard relation $$AC = \langle f(x,y), f(x,y) \rangle = \Sigma_m \Sigma_n f(m,n) f(x+m, y+n)$$

Where the indices m and n run from 0 to M−1 and N−1 respectively, and the indices x and y run from 0 to M−1 and N−1 respectively. A convenient way to obtain the autocorrelation function is to Fourier transform the function f and square its amplitude and inverse Fourier transform the result. The autocorrelation function is a measure of how similar the function is to itself across space. In the present case we use the image intensity as the function of the x and y image dimensions.

Figure 9:
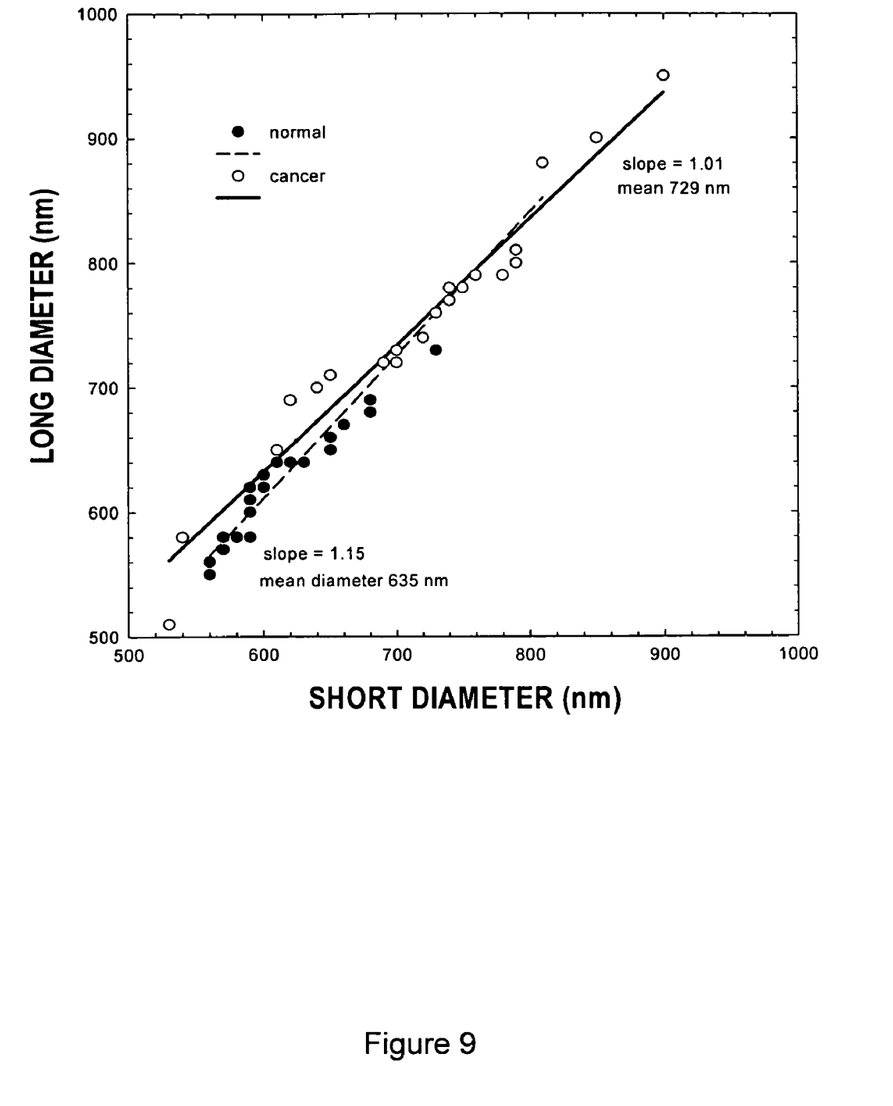
FIG. 9 illustrates a relationship between the long and short diameters of mitochondria in normal and cancer cells.

A further method of discriminating normal and cancer cells is to perform a statistical analysis of the size and shape of individual mitochondria within the cell. The fluorescent images of FIG. 2 were further analyzed by measuring the length and width of mitochondria in the dilute regions of the cell, near the membrane or on top of the nucleus, where individual organelles could be observed. The results are shown in FIG. 9 where the long diameter is plotted against the short diameter. Statistical analyses show that the mean diameter for the cancer mitochondria is about 15% larger, that the standard deviation of the mean diameter is about have about 3 times higher, and that the cancer-cell mitochondria are very round compared to the more ovoid normal mitochondria. The measured long and short diameters of mitochondria in low-density regions of cells are shown for normal (closed points) and cancer (open points) cells.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for detecting an abnormal cell, comprising:
   directing light onto a cell using an imaging microscope;
   generating a pixelated image of the cell using interacted light, wherein the pixelated image contains optical information about a mitochondrial network of the cell;
   generating a Fourier transform of the pixelated image to form a Fourier transform image of the cell; and
   analyzing at least one of an abruptness of transition from a central zone to a halo zone of the Fourier transform image and a line profile of a segment of an autocorrelation image generated using the Fourier transform image to determine whether the cell is abnormal.

2. The method of claim 1, wherein the interacted light is fluorescent light.

3. The method of claim 2, wherein the fluorescent light is emitted by a dye that is selectively bound to a mitochondrion in the cell.

4. The method of claim 1, wherein the interacted light is wide-angle-scattered light.

5. The method of claim 1, wherein the pixelated image is a composite image generated using at least two types of interacted light.

6. The method of claim 1, wherein the line profile of the segment of the autocorrelation image has a local minimum when the cell is cancerous.

* * * * *